Aug. 7, 1928.
G. M. RUFF
1,679,946
DUPLEX TOOTHBRUSH
Filed June 8, 1927
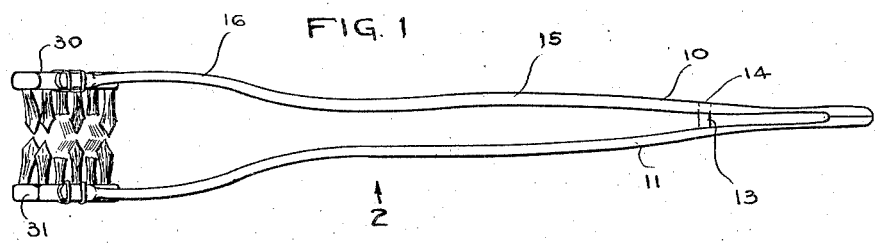
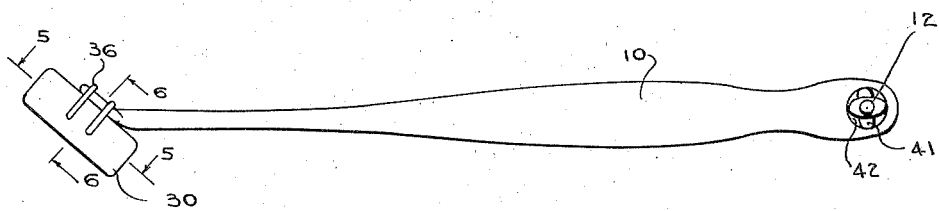
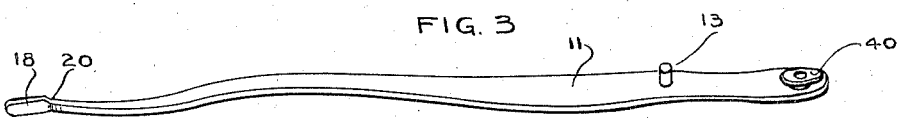
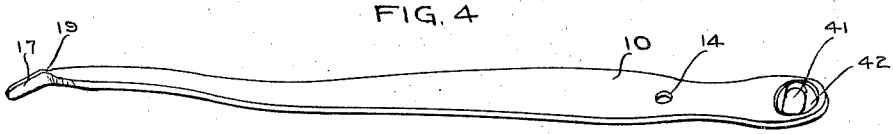
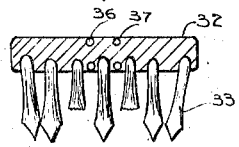
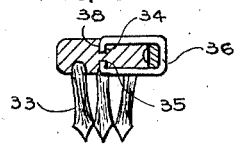
INVENTOR
GUY M. RUFF
BY Hazard and Miller
ATTORNEYS Patented Aug. 7, 1928.

1,679,946

UNITED STATES PATENT OFFICE.

GUY M. RUFF, OF LOS ANGELES, CALIFORNIA.

DUPLEX TOOTHBRUSH.

Application filed June 8, 1927. Serial No. 197,470.

This invention relates to dental apparatus and more particularly to a duplex toothbrush that is adapted to perform the brushing and cleaning operation upon the teeth simultaneously at a plurality of angles.

It is an object of this invention to provide a device wherein there are a pair of brush units detachably connected to a duplex handle, which brush units may be secured to said handle in a plurality of positions so as to enable the user to effectively clean the teeth in an efficient manner.

A still further object of this invention is to provide a device which is inexpensive to manufacture, contains relatively few moving parts, is unlikely to get out of order, and is well adapted to perform the services required of it.

With these and many other objects in view which will more readily appear as the nature of the invention is better understood, the same consists in the novel construction, combination, and arrangement of parts, which will hereinafter be more fully described, illustrated, and claimed.

The essential features of the invention involved in the carrying out of the objects indicated are susceptible to modification; but a preferred embodiment of the invention is shown in the accompanying drawings, in which:

Figure 1 is a front elevation of the device shown in assembled relationship.

Fig. 2 is a side elevation of the device.

Fig. 3 is a perspective view of one element of the duplex handle employed in connection with my device.

Fig. 4 is a perspective view of the counterpart handle shown in Figure 3.

Fig. 5 is a sectional view taken substantially along the lines 5—5 of Figure 2, and Fig. 6 is a sectional view taken substantially along the lines 6—6 of Figure 2.

The figures described above adequately illustrate my invention, and the following detailed description is commensurate with the above mentioned drawings in enabling an artisan to construct and assemble the constituent parts of the same.

The device involves in its general organization a pair of spring handles 10 and 11, which handles are releasably and pivotally connected together as at 12, and in order to insure alignment with the handles, a projection 13 is provided on one of these handles, which projection is receivable in an aperture 14 in the other handle. Each handle is bowed outwardly centrally of its length as at 15, and the handles diverge from each other at one end when pivoted together as at 16. The extreme ends of each handle are provided with an inclined flat portion 17 and 18, which flat portions have transverse grooves 19 and 20 formed therein for a purpose to be described later. A pair of brush units are illustrated at 30 and 31 respectively, each unit consisting of a back plate 32 having bristles 33 embedded therein. Each side of the back plate is provided with a depression, which depressions are designated at 34 and 35 respectively, and U-shaped wire clips 36 and 37 having their ends turned inwardly as at 38, are receivable in these depressions and extend outwardly beyond the side of the back portion. The flat portions 17 and 18 are adapted to be inserted between the back of the brush units and the U-shaped wire clips as clearly shown in Figure 2, and the transverse groove in the flat portion serves to hold the units in place on the handles. The units may be inserted on the handles in any desired position, but it is preferable to insert the same as shown in Figure 1, so that the brushes are positioned in opposed relationship. The manner in which the handles are pivoted together is as follows.

An elliptical member 40 is mounted on the handle 11 and overlies the same. An elliptical slot 41 is formed in the handle 10, and the marginal elliptical slot is reduced in thickness so that the elliptical member 40 may pass completely through the slot, and when the handles are swung on each other, the elliptical member 40 will engage the reduced portion 42 and firmly hold the handles in pivoted relationship. When it is desired to disengage the handles, it is merely necessary to swing the same so that the elliptical member 40 is in alignment with the elliptical aperture, and the handles may be separated.

The above description is believed to be adequate to clearly define my invention as required by the statutes, and I will now proceed with a description of the operation of my device. When the brush units have been inserted on the handles so as to occupy the position shown in Figure 1, both the front and rear surfaces of the teeth may be brushed simultaneously, and access may be had to the entire surface of the same. Few people understand the proper brushing of the teeth and realize the importance of cleaning the inside as well as the outside surfaces of the teeth. With the conventional type of toothbrush it is customary for the user to merely brush the forward exposed surfaces of the teeth and neglect the rear surfaces. With my improved toothbrush, the user, when brushing the front surfaces of the teeth, at the same time brushes the rear surfaces of the teeth. The handles are resilient, and the desired amount of pressure on the brush may be obtained by manually pressing the handles towards each other when brushing the teeth. As each of the brush units assume positions on the outer and inner surface of the teeth, the desired amount of pressure may simultaneously be applied to the handles so that the bristles will be forced into the inter proximal spaces at the gum line or contact points of the teeth. The angle at which the units are inclined on the handle will insure at all times that the bristles squarely engage the teeth to clean the same.

From the foregoing, it is thought that the construction, use and many advantages of the herein-described duplex toothbrush will be readily apparent without further description, and it will also be understood that changes in the form, proportion, and minor details of construction may be resorted to without departing from the spirit of the invention or sacrificing any of the advantages thereof.

What I claim by this invention and desire to secure by Letters Patent, is:

1. A toothbrush comprising a pair of handles, an inclined flat portion having a groove thereon on the ends of each of said handles, brush backs having bristles embedded therein, U-shaped wire clips attached to said backs and extending outwardly therefrom, said flat portion being receivable between said U-shaped wire clips and said backs, certain of said wire clips resting in said grooves.

2. A tooth brush comprising a pair of handles, one of said handles having at one end an elongated locking member lying above the plane of the handle, the other handle being provided at one end with an undercut elongated slot for the reception of said locking member whereby said handles are releasably held in pivoted relation, opposed brushes disposed at an angle to said handles at the other end, said brushes being parallel and at an angle to the plane of the handles.

In testimony whereof I have signed my name to this specification.

GUY M. RUFF.